United States Patent
Cho

(10) Patent No.: US 11,312,243 B2
(45) Date of Patent: Apr. 26, 2022

(54) METHOD FOR OPTIMIZING TRAVELING OF ELECTRIC VEHICLE

(71) Applicants: Hyundai Motor Company, Seoul (KR); Kia Motors Corporation, Seoul (KR)

(72) Inventor: Woo-Cheol Cho, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 355 days.

(21) Appl. No.: 16/390,962

(22) Filed: Apr. 22, 2019

(65) Prior Publication Data

US 2020/0047629 A1 Feb. 13, 2020

(30) Foreign Application Priority Data

Aug. 9, 2018 (KR) .................. 10-2018-0093342

(51) Int. Cl.
*B60L 15/20* (2006.01)
*B60L 58/12* (2019.01)
*G01C 21/34* (2006.01)

(52) U.S. Cl.
CPC .......... *B60L 15/2045* (2013.01); *B60L 58/12* (2019.02); *G01C 21/3469* (2013.01); *B60L 2240/12* (2013.01); *B60L 2240/423* (2013.01); *B60L 2240/62* (2013.01)

(58) Field of Classification Search
CPC .. B60L 15/2045; B60L 58/12; B60L 2240/62; B60L 2240/12; B60L 2240/423; B60L 53/665; B60L 2250/16; B60L 2240/64; B60L 2250/28; G01C 21/3469; Y02T 90/12; Y02T 10/7072; Y02T 10/70; Y02T 10/64; Y02T 90/16; Y02T 10/72; B60Y 2200/91

See application file for complete search history.

(56) References Cited

U.S. PATENT DOCUMENTS

2017/0057490 A1* 3/2017 Kimura ................ B60W 10/06

FOREIGN PATENT DOCUMENTS

KR 20150089272 A 8/2015

OTHER PUBLICATIONS

Machine Translation of WO 2012/114425 (Year: 2012).*
Speed Limits in the United States, wikipedia, 2018 (Year: 2018).*

* cited by examiner

*Primary Examiner* — Alan D Hutchinson
(74) *Attorney, Agent, or Firm* — Mintz Levin Cohn Ferris Glovsky and Popeo, P.C.; Peter F. Corless

(57) ABSTRACT

A method for optimizing the traveling of an electric vehicle may include setting an ultra power saving mode for controlling the traveling of an electric vehicle by minimizing consumed energy when a State Of Charge (SOC) of a high voltage battery is equal to or smaller than a predetermined SOC, calculating traveling energy required for traveling from a current location to a destination by a control unit of the electric vehicle, determining whether or not to reach the destination with the energy of the high voltage battery, and calculating a destination reachable vehicle speed zone that calculates a maximum speed and a minimum speed that can reach the destination.

20 Claims, 9 Drawing Sheets

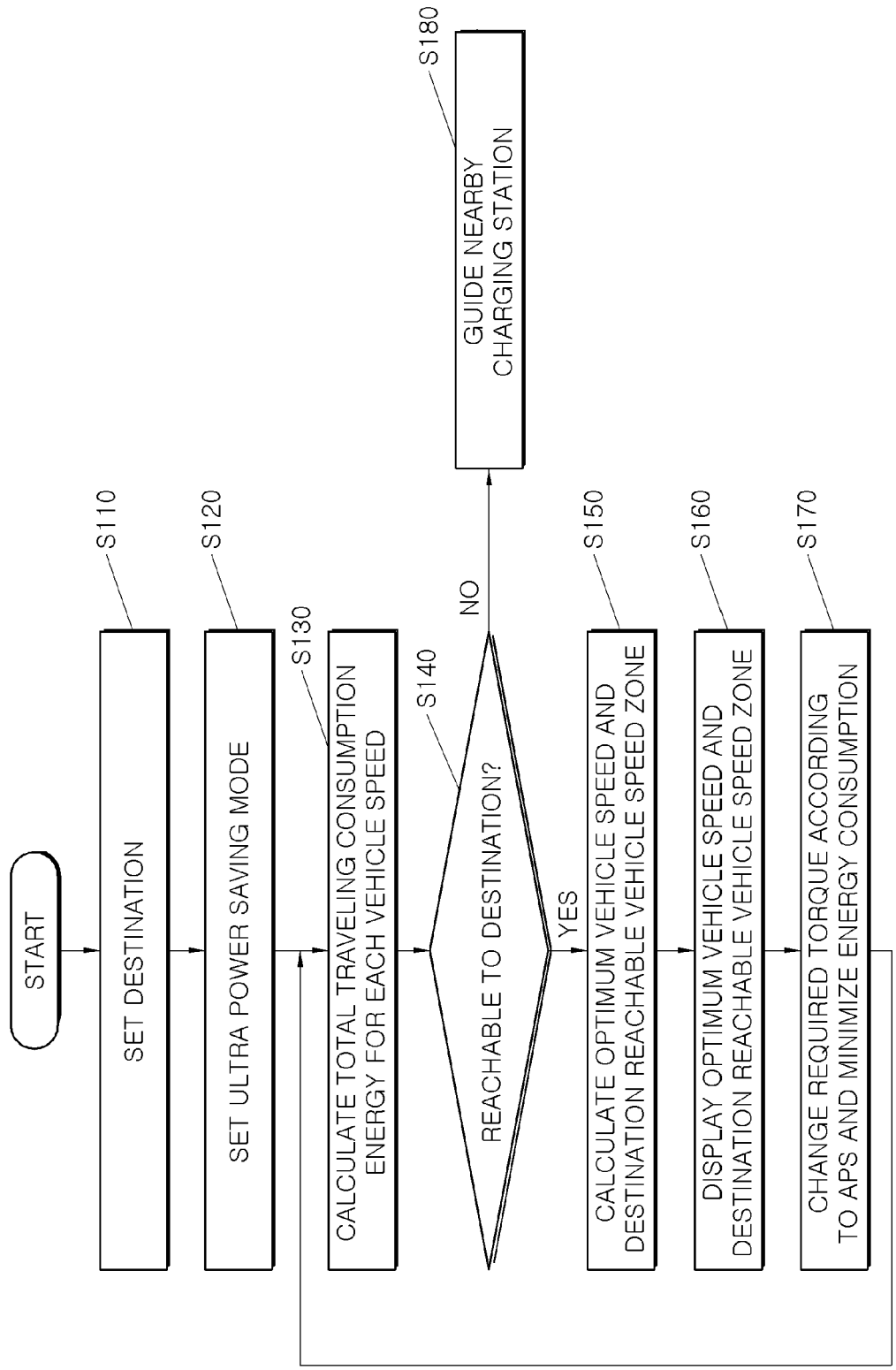

METHOD FOR OPTIMIZING TRAVELING OF ELECTRIC VEHICLE

CROSS-REFERENCE TO RELATED APPLICATION

This application claims priority to Korean Patent Application No. 10-2018-0093342, filed on Aug. 9, 2018, which is incorporated herein by reference in its entirety.

BACKGROUND OF THE DISCLOSURE

Field of the Disclosure

The present disclosure relates to a method for optimizing an electric vehicle, which calculates a Distance To Empty of the electric vehicle to be recognizable by a driver, and induces so that the electric vehicle can reach a destination while minimally consuming the power charged in a battery.

Description of Related Art

An electric vehicle traveling by the power charged in a battery mounted in a vehicle has a shorter distance to travel with a full charging once than a vehicle equipped with a general internal combustion engine and cannot charge the battery during traveling, such that the power charged in the battery of the electric vehicle should be efficiently managed.

Not only the time taken for charging is much longer than the time taken for injecting fuel into the internal combustion engine vehicle but also a charging infrastructure is not sufficient yet, such that when the power of the battery mounted in the vehicle is not efficiently managed, the electric vehicle cannot reach a desired destination. In reality, the battery is all discharged during traveling to thereby become in the state where the traveling is impossible, such that the electric vehicle is often towed.

The electric vehicle displays the charged amount of the battery through an instrument panel, etc., and also displays a Distance To Empty by calculating the charged amount of the battery with the distance traveled so far.

However, the electric vehicle in the related art as described above has displayed only the Distance To Empty through a simple calculation, and has not guided that the driver should travel at a certain speed in order to minimize power consumption.

In addition, there is a problem in that when the driver travels the vehicle at a speed consuming a large amount of energy while the charged amount of the battery is not much, the vehicle cannot reach the destination.

The contents described in Description of Related Art are to help the understanding of the background of the present disclosure, and can include what is not previously known to those skilled in the art to which the present disclosure pertains.

SUMMARY OF THE DISCLOSURE

The present disclosure is intended to solve the above problems, and an object of the present disclosure is to provide a method for optimizing the traveling of an electric vehicle, which guides whether or not the vehicle can reach a destination with the current charged amount of a battery and also guides a vehicle speed that can reach the destination while consuming minimum power.

A method for optimizing the traveling of an electric vehicle in accordance with the present disclosure for achieving the object includes setting an ultra power saving mode that controls the traveling of an electric vehicle by minimizing consumed energy when a State Of Charge (SOC) of a high voltage battery is equal to or smaller than a predetermined SOC; calculating traveling energy required for traveling from a current location to a destination by a control unit of the electric vehicle; determining whether or not to reach the destination with the energy of the high voltage battery; and calculating a destination reachable vehicle speed zone that calculates a maximum speed and a minimum speed that can reach the destination.

The setting the ultra power saving mode sets the ultra power saving mode using the energy charged in the high voltage battery and a remaining distance from the current location of the electric vehicle to the destination by the control unit of the electric vehicle.

The control unit sets the ultra power saving mode by comparing a ratio of the remaining distance to the destination and the Distance To Empty that can travel with a current SOC with a predetermined ultra power saving mode entry reference value.

The ultra power saving mode reference value is set to be greater than 1.

The ultra power saving mode reference value is set according to the remaining distance to the destination.

The ultra power saving mode reference value is set to be inversely proportional to the remaining distance to the destination.

The setting the ultra power saving mode enters by operating an ultra power saving mode setting means by a passenger of the electric vehicle.

The calculating the traveling energy calculates the traveling energy required for traveling from the current location to the destination at a corresponding vehicle speed, respectively, according to a plurality of vehicle speeds.

The calculating the traveling energy calculates, for each vehicle speed, the traveling energy per unit distance, calculates additional energy per unit distance according to the road gradient, calculates the traveling energy per unit distance by adding the traveling energy per unit distance and the additional energy per unit distance, calculates the traveling energy that is the energy consumed to the destination at the corresponding vehicle speed by integrating the traveling energy per unit distance from the current location to the destination, and calculates the traveling energy for each vehicle speed.

The determining whether or not to reach the destination determines to be reachable to the destination when a value smaller than the energy charged in the high voltage battery is present among the traveling energy calculated for each vehicle speed in the calculating the traveling energy.

The calculating the destination reachable vehicle speed zone sets between a maximum speed and a minimum speed that can reach the destination among the traveling energy calculated for each vehicle speed as a destination reachable vehicle speed zone.

The calculating the destination reachable vehicle speed zone sets a vehicle speed consuming minimum traveling energy among the traveling energy calculated for each vehicle speed as an optimum vehicle speed.

The method for optimizing the traveling of the electric vehicle further includes displaying the destination reachable vehicle speed zone that displays the optimum vehicle speed and the destination reachable vehicle speed zone through a display, after the calculating the destination reachable vehicle speed zone.

The displaying the destination reachable vehicle speed zone displays the optimum vehicle speed, the destination reachable vehicle speed zone, and the current vehicle speed of the electric vehicle altogether.

In the displaying the destination reachable vehicle speed zone, the destination reachable vehicle speed zone is narrowly displayed as the SOC of the high voltage battery reduces.

The displaying the destination reachable vehicle speed zone displays so that the destination reachable vehicle speed zone gradually becomes large when a speed, at which the SOC of the high voltage battery reduces, is slower as the electric vehicle travels, and displays so that the destination reachable vehicle speed zone gradually becomes small when a speed, at which the SOC of the high voltage battery reduces, is faster as the electric vehicle travels.

The method for optimizing the traveling of the electric vehicle further includes changing a required torque of the electric vehicle according to the operation amounted of an accelerator pedal of the electric vehicle, after the calculating the destination reachable vehicle speed zone.

The changing the required torque sets a range of an APS for maintaining the optimum vehicle speed.

The changing the required torque includes a first phase calculating the required torque of the electric vehicle for maintaining the optimum vehicle speed and selecting the APS for maintaining the optimum vehicle speed, and a second phase setting the range of the APS that can maintain the optimum vehicle speed, and wherein when the required torque is requested within the range of the APS set in the second phase, the required torque is generated according to a required torque map of the electric vehicle with the APS selected in the first phase.

After the second phase, the required torque map adjacent to the upper limit and the lower limit in the range of the APS set in the second phase is changed to be adjacent to the required torque map selected in the first phase.

The changing the required torque downwardly changes a driving voltage of an LDC together with the change in the required torque, and minimizes the energy consumed in the electric load of the electric vehicle.

When the electric vehicle is traveling after the changing the required torque, it is performed from the calculating the traveling energy again.

The method for optimizing the traveling of the electric vehicle further includes guiding the route to a charging station located within a Distance To Empty that can travel with the current SOC of the high voltage battery, when it is determined to be unreachable to the destination with the SOC of the high voltage battery in the determining whether or not to reach the destination.

According to the method for optimizing the traveling of the electric vehicle of the present disclosure having the above configuration, it is possible to confirm whether or not to reach the destination that is set by the current charged amount of the battery, and to reach the destination when traveling in the guided vehicle speed zone, thus relieving the anxiety as to whether or not to reach the destination.

In addition, it is possible to reduce the size of the vehicle speed zone when exceeding the vehicle speed zone, thus inducing so that the vehicle travels with minimum power consumption.

BRIEF DESCRIPTION OF THE DRAWINGS

FIG. 9 is a graph illustrating calculating a torque for maintaining an optimum vehicle speed set by the selected APS, FIG. 10 is a graph illustrating the state setting an APS band for maintaining the optimum vehicle speed, and FIG. 11 is a graph illustrating the state where the required torque has been adjusted for an APS adjacent to the selected APS.

FIG. 12 is a flowchart illustrating the method for optimizing the traveling of the electric vehicle in accordance with the present disclosure.

DESCRIPTION OF SPECIFIC EMBODIMENTS

Hereinafter, a method for optimizing the traveling of an electric vehicle in accordance with the present disclosure will be described in detail with reference to the accompanying drawings.

Figure 1:
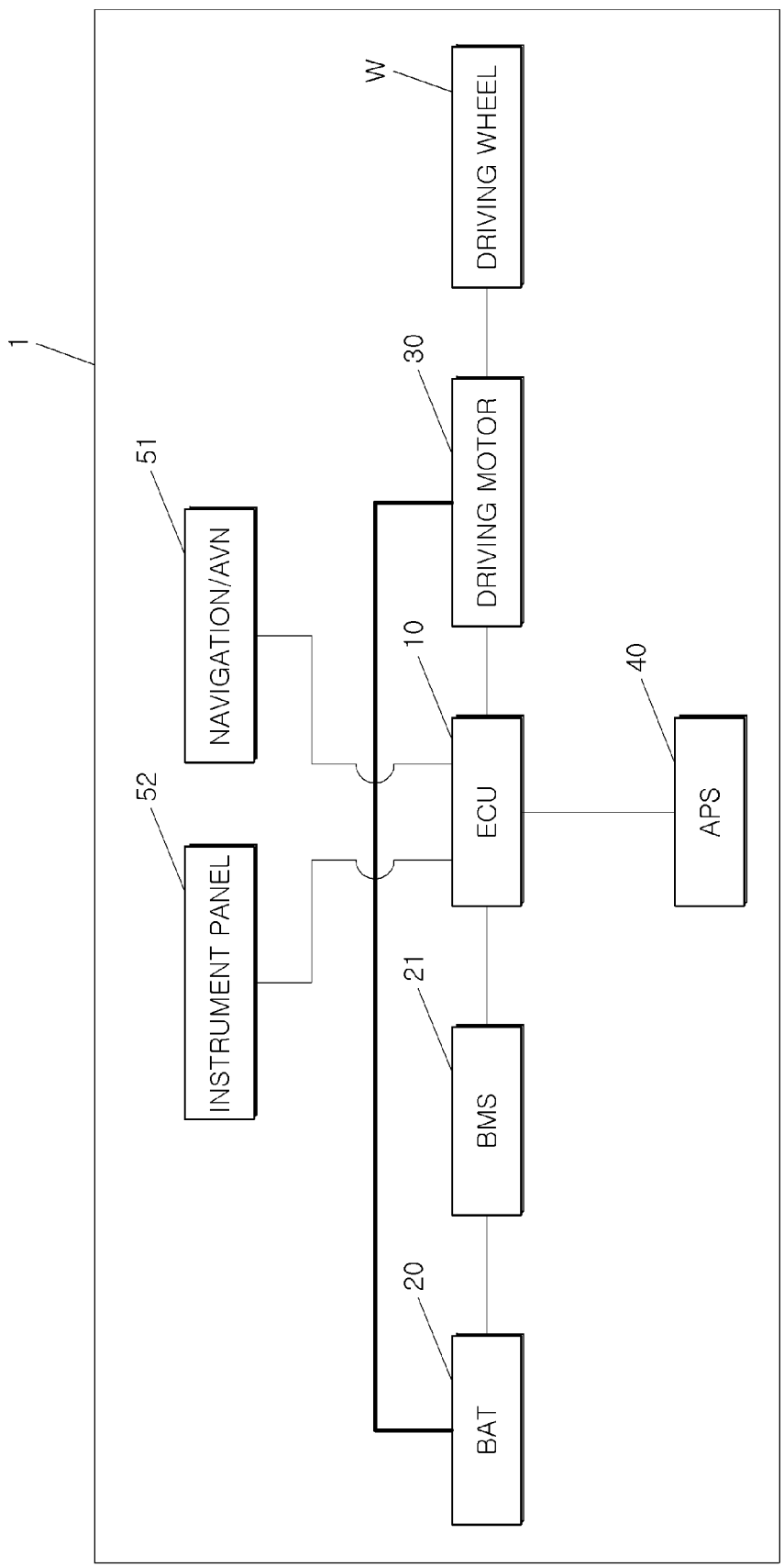
FIG. 1 is a block diagram illustrating a configuration of an electric vehicle for performing a method for optimizing the traveling of the electric vehicle in accordance with the present disclosure.

Referring to FIG. 1, a configuration of an electric vehicle 1 for performing a method for optimizing the traveling of the electric vehicle in accordance with the present disclosure will be simply described as follows.

The electric vehicle 1 can travel by driving a driving motor 30 with the power stored in a high voltage battery 20, and driving a driving wheel W of the electric vehicle 1 with the power generated in the driving motor 30.

The overall control of the electric vehicle 1 is performed by a control unit of the electric vehicle 1, for example, an ECU 10. The ECU 10 receives the information of the high voltage battery 20 through a Battery Management System (BMS) 21 for controlling the high voltage battery 20, and performs a method for optimizing the traveling of the electric vehicle, which will be described later, according to a State Of Charge (SOC) of the high voltage battery 20.

In addition, the ECU 10 receives an acceleration pedal location on which a driver intends to accelerate from an APS 40, and a navigation 51 and an instrument panel 52 for displaying a destination reachable vehicle speed zone Z that can travel to the destination by the SOC of the high voltage battery 20 and an optimum vehicle speed $V_o$ for traveling with minimum energy consumption to reach the destination are provided therein to display the optimum vehicle speed $V_o$ and the destination reachable vehicle speed zone Z, which are calculated by the ECU 10, a current vehicle speed V, etc.

The ECU 10 stores the method for optimizing the traveling of the electric vehicle, which will be described later, as logic, and performs it.

The method for optimizing the traveling of the electric vehicle in accordance with the present disclosure will be described as follows.

Setting a destination S110 is to set the destination on the navigation 51 mounted in the electric vehicle 1 by a passenger.

When the passenger sets the destination on the navigation 51, the navigation 51 guides the route of the electric vehicle 1 from the current location to the destination.

The navigation 51 is preferably connected to an Electronic Control Unit (ECU) for controlling the electric vehicle 1. The navigation 51 is connected to the ECU 10 so that information such as a distance to the destination and the road gradient is delivered from the navigation 51 to the ECU 10. In addition, the ECU 10 can deliver the information on the destination reachable vehicle speed zone Z and optimum vehicle speed $V_o$ calculated by the ECU 10 to the navigation 51 so that the navigation 51 can become a means for displaying the destination reachable vehicle speed zone Z and the optimum vehicle speed $V_o$ thereon.

The navigation 51 can be also an Audio, Video, Navigation (AVN) terminal including a multimedia function such as audio and video.

Setting an ultra power saving mode S120 is to set a traveling mode, in which the State Of Charge (SOC) of the high voltage battery 20 mounted in the electric vehicle 1 is equal to or less than a predetermined SOC and which travels the electric vehicle 1 by minimizing the energy charged in the high voltage battery 20, as an ultra power saving mode.

The electric vehicle 1 can select the traveling mode according to the preference of the passenger including the driver, or the road situation. Among them, in the power saving mode (the eco mode), the ECU 10 controls the electric vehicle 1 so that the electric vehicle 1 travels with the priority to the optimization of the energy consumption rather than acceleration performance or traveling performance. Meanwhile, the ultra power saving mode is an operation mode to further reduce the energy consumption than the power saving mode.

The ultra power saving mode can be automatically set by the ECU 10, or can be set by the passengers selection.

When the ultra power saving mode is automatically set by the ECU 10, the ECU 10 calculates it by using the SOC of the high voltage battery 20 and a remaining distance to the destination to set the ultra power saving mode.

That is, the ECU 10 can set to enter the ultra power saving mode by comparing a value, which divides the remaining distance from the current location to the destination by a Distance To Empty (DTE) that can travel with the current SOC, with a predetermined ultra power saving mode entry reference value A.

This can be expressed as the following equation.

'(Distance To Empty)/(the remaining distance to the destination)<$A$' or '(the remaining distance to the destination)/(Distance To Empty)>(1/$A$)'

Meanwhile, the ultra power saving mode entry reference value A can be set by adding a predetermined margin m to 1.

For example, the ultra power saving mode entry reference value A can be set to 1.2. The 1.2 in the ultra power saving mode entry reference value A means that the margin m of 20% has been set for the Distance To Empty with the current SOC.

Meanwhile, the margin m is set to be inversely proportional to the remaining distance to the destination, such that the ultra power saving mode entry reference value A is set to be larger as the remaining distance to the destination is short. The ultra power saving mode entry reference value A can be set to be smaller as the remaining distance to the destination is long.

The reason why the ultra power mode entry reference value A is set variously according to the remaining distance to the destination is as follows. When the remaining distance to the destination is much, there is a possibility that does not enter the ultra power saving mode through the driver's intent such as performing charging by the driver during traveling on the route or intentionally maintaining the SOC through an economic operation when the remaining distance to the destination is long, such that the margin m can be set to be small. Then, when the remaining distance to the destination is small, additional possible events (e.g., charging, intentional economic operation, etc.) are few in order to highly maintain the SOC, such that the margin m is set to be large in order to automatically enter the ultra power saving mode quickly by increasing the margin m.

For example, when the remaining distance to the destination is 100 km and the DTE is 120 km, and when the remaining distance to the destination is 10 km and the DTE is 12 km, the driver and the passenger feel more anxious in the latter case.

Accordingly, the ultra power saving mode entry reference value A or the margin m is set to be larger as the remaining distance to the destination is short.

The ultra power saving mode entry reference value A or the margin m can be previously stored variously in the form of a table according to the remaining distance to the destination.

Meanwhile, the ultra power saving mode can be set by the passenger's selection. When the passenger operates the ultra power saving mode setting means installed in the electric vehicle 1 and a signal is delivered to the ECU 10, the ECU 10 causes the electric vehicle 1 to enter the ultra power saving mode. The ultra power saving mode setting means can be a button, a switch, a knob, etc. For example, the passenger operates a traveling mode selection switch provided in the indoor of the electric vehicle 1 or selects a menu on the screen such as the navigation 51 or the AVN to enter the ultra power saving mode.

In calculating traveling energy S130, the ECU 10 accumulates traveling energy $E_T$ consumed by each of a plurality of vehicle speeds from the current location to the destination.

The calculating the traveling energy S130 will be described in detail as follows.

First, the ECU 10 calculates the traveling energy per unit distance dE (1 km).

$$dE \text{ [kWh/km]} = 1/\text{electric efficiency [kWh/km]} + (\text{air conditioning} + \text{electric}) \text{load/vehicle speed [kWh/km]} \quad \text{[Equation 1]}$$

A concept of the electric efficiency is a concept corresponding to the fuel efficiency of a general internal combustion engine vehicle in the electric vehicle 1, and represents the distance (km) that can travel with 1 kWh charged in the battery. The energy consumed to travel a unit distance of 1 km is the reciprocal thereof, such that it can be expressed as '1/electric efficiency.' In addition, the battery of the electric vehicle 1 supplies energy not only for traveling the vehicle but also for supplying power to an air conditioning device or an electric component, such that the traveling energy per unit distance dE (e.g., 1 km) can be obtained as in Equation 1 by reflecting it.

Then, additional energy P according to the road gradient is calculated through the following Equation 2.

$$P \text{ [W]} = F \times v = [\text{vehicle weight} \times \text{gravitational acceleration} \times \sin(f(x))] \times \text{vehicle speed} \times 1000/3600 \text{ [m/s]} \quad \text{[Equation 2]}$$

Herein, the f(x) in the sin(f(x)) refers to a gradient angle of the road surface on which the electric vehicle 1 travels, and the electric vehicle 1 travels along a continuous road surface, thus being provided in the form of the function.

Then, the traveling energy per unit distance (1 km) $dE_T$ is calculated.

$$dE_T \text{[kWh/km]} = dE + \frac{P}{\text{vehicle speed [km/h]}} \text{[kWh/km]} \quad \text{[Equation 3]}$$

The traveling energy per unit distance (1 km) $dE_T$ is calculated by adding the traveling energy per unit distance (1 km) dE and a value obtained by dividing the additional energy P according to the road gradient per unit distance (1 km) by the vehicle speed.

Then, total traveling energy $E_T$ is obtained by accumulating the traveling energy per unit distance $dE_T$ for the distance from the current location to the destination.

$$E_T = \int_{current\ location}^{destination} dE_T dx \quad \text{[Equation 4]}$$

That is, the total traveling consumed energy $E_T$ becomes a traveling energy $E_T$, which is total energy consumed to travel from the current location to the destination at the corresponding vehicle speed.

Accordingly, the traveling energy $E_T$ for each vehicle speed of a plurality of predetermined vehicle speeds is calculated, respectively. For example, when the vehicle speed is set to an interval of 10 km/h, the traveling energy per unit distance (km) dE and the additional energy P according to the road gradient are obtained for each vehicle speed, the traveling energy per unit distance (1 km) $dE_T$ is calculated by adding them and then the traveling energy per unit distance (1 km) $dE_T$ consumed to the destination is integrated. The traveling energy $dE_T$ for each vehicle speed is obtained by calculating it for each of the plurality of vehicle speeds, respectively.

Meanwhile, it is preferable that the calculating the traveling energy S130 calculates the traveling energy $E_T$ for each vehicle speed only at a speed that is equal to or less than the speed limit, and does not calculate the traveling energy $E_T$ at the speed limit or more.

Determining whether or not to reach the destination S140 determines whether or not the ECU 10 determines whether or not to travel to the destination with the current SOC of the high voltage battery 20.

That is, when there is a vehicle speed that consumes the traveling energy $E_T$ smaller than the current available energy of the battery among the traveling energy $E_T$ calculated for each vehicle speed in the calculating the traveling energy S130, it is determined that the electric vehicle 1 can reach the destination. That is, the traveling energy $E_T$ is calculated for each vehicle speed in the calculating the traveling energy S130, such that when there is a vehicle speed at which the traveling energy $E_T$ is smaller than the current available energy of the battery, it is determined that the electric vehicle 1 can reach the destination.

For example, in the calculating the traveling energy S130, the traveling energy $E_T$ is calculated for the speeds of 10 km/h, 20 km/h, 100 km/h, and among them, when the traveling energy $E_T$ calculated for the speeds of 10 km/h, 70 km/h, 80 km/h, 90 km/h, 100 km/h is greater than the current available energy of the battery, and the traveling energy $E_T$ calculated for the speeds of 20 km/h, 30 km/h, 40 km/h, 50 km/h, 60 km/h is smaller than the current available energy of the battery, it is determined that the vehicle can reach the destination because the vehicle speeds of 20 km/h to 60 km/h smaller than the current available energy of the battery are present.

Calculating the destination reachable vehicle speed zone S150 calculates an optimum vehicle $V_o$ that is a speed traveling the electric vehicle 1 while minimizing the energy consumption of the high voltage battery 20 so that the electric vehicle 1 reaches from the current location to the destination, and the destination reachable vehicle speed zone Z that is a range of a maximum speed and a minimum speed that can reach the destination.

The calculating the destination reachable vehicle speed S150 calculates the speed that can reach the destination with minimum energy consumption among the speeds that can reach the destination by the optimum vehicle speed $V_o$.

In this time, the optimum vehicle speed and the upper limit and lower limit of the destination reachable vehicle speed can be selected from the vehicle speeds consuming the traveling energy $E_T$ that can reach the destination in the determining whether or not to reach the destination S140. For example, the optimum vehicle speed becomes a vehicle speed consuming the smallest traveling energy $E_T$ among the vehicle speeds consuming the traveling energy $E_T$ that can reach the destination, and the upper limit and the lower limit of the destination reachable vehicle speed become the maximum vehicle speed and the minimum vehicle speed, respectively, among the vehicle speeds consuming the traveling energy $E_T$ that can reach the destination.

Alternatively, the traveling energy $E_T$ for each vehicle speed can be calculated again in the same manner as in the calculating the traveling energy S130, and can be also obtained by further subdividing an interval of the vehicle speed.

Displaying the destination reachable vehicle speed zone S160 displays the optimum vehicle speed and destination reachable vehicle speed zone calculated in the calculating the destination reachable vehicle speed zone S150 through the display installed in the electric vehicle 1.

The display on which the optimum vehicle speed and the destination reachable vehicle speed zone are displayed can be the instrument panel 52 of the electric vehicle 1 and can be also the navigation 51 or the AVN.

Meanwhile, the displaying the destination reachable vehicle speed zone S160 displays not only the optimum vehicle speed and the destination reachable vehicle speed zone but also the current vehicle speed together. This is for inducing the vehicle to be within the destination reachable vehicle speed zone when the current vehicle speed is out of the destination reachable vehicle speed zone. Particularly, this is for inducing the current vehicle speed to be equal to the optimum vehicle speed.

Figure 2:
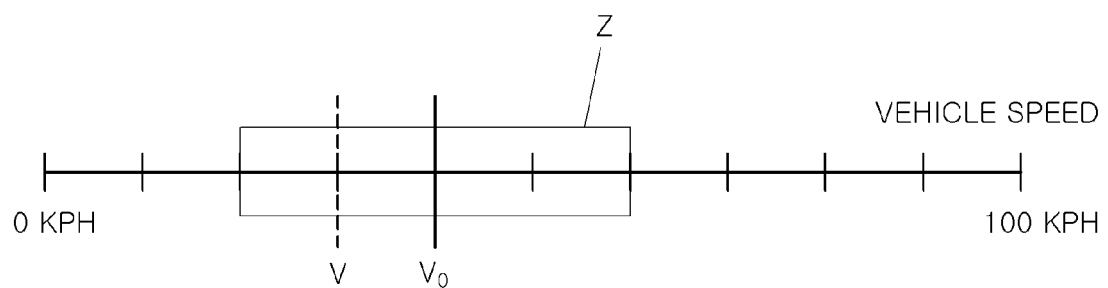
FIG. 2 is a schematic diagram illustrating an example of displaying a destination reachable vehicle speed zone, an optimum vehicle speed, and a current vehicle speed by the method for optimizing the traveling of the electric vehicle in accordance with the present disclosure.

FIG. 2 illustrates an example of displaying the current vehicle speed V, the optimum vehicle speed $V_o$, and the destination reachable vehicle speed zone Z by the displaying the destination reachable vehicle speed zone S160.

The displaying the destination reachable vehicle speed zone S160 displays the current vehicle speed V, the optimum vehicle speed $V_o$, and the destination reachable vehicle speed zone Z according to various situations.

Figure 3:
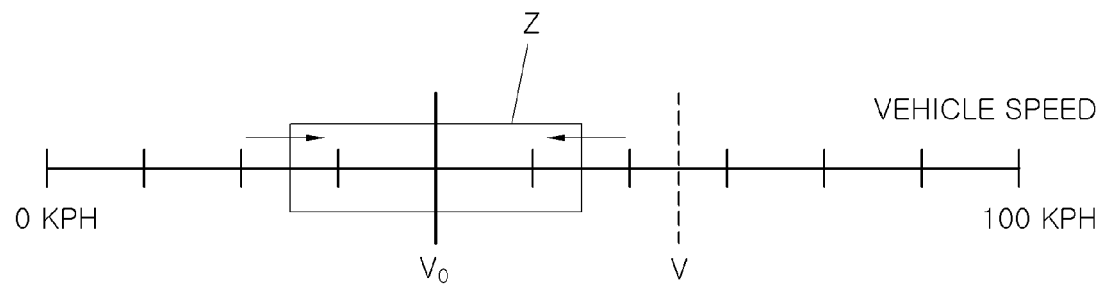
FIG. 3 is a schematic diagram illustrating an example of displaying a newly set destination reachable vehicle speed zone, an optimum vehicle speed, and a current vehicle speed when traveling out of the destination reachable vehicle speed zone set in FIG. 2 in the method for optimizing the traveling of the electric vehicle in accordance with the present disclosure.

For example, in FIG. 3, the distance to the destination is the same as that in FIG. 2, and the vehicle can reach the destination with the SOC of the high voltage battery 20, but the SOC is lower than that of FIG. 2 and the vehicle travels in the state where the current vehicle speed is out of the destination reachable vehicle speed zone. The vehicle can reach the destination with the current SOC of the high voltage battery 20, such that the optimum vehicle speed $V_o$ can be set to the speed as in FIG. 2, but the SOC is lower than that in FIG. 2, such that the destination reachable vehicle speed zone Z becomes narrow. Meanwhile, the current vehicle speed V of the vehicle is higher than the destination reachable vehicle speed zone Z, such that the driver recognizes that cannot reach the destination at the current vehicle speed V.

In addition, when the vehicle continues to travel in this state, the destination reachable vehicle speed zone Z is displayed to be smaller continuously.

Figure 4:
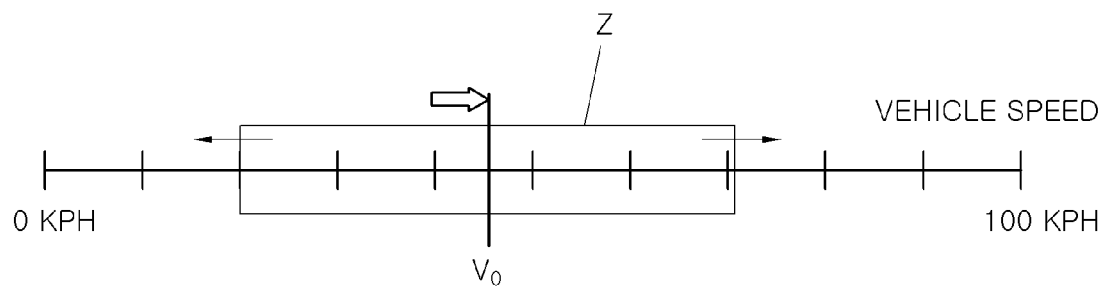
FIG. 4 is a schematic diagram illustrating an example of displaying a newly set destination reachable vehicle speed zone and an optimum vehicle speed when traveling downhill while traveling in the destination reachable vehicle speed zone set in FIG. 2 in the method for optimizing the traveling of the electric vehicle in accordance with the present disclosure.
Figure 5:
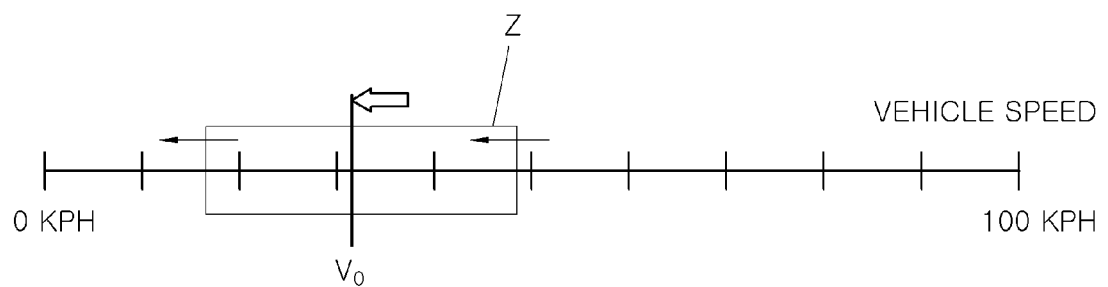
FIG. 5 is a schematic diagram illustrating an example of displaying a newly set destination reachable vehicle speed zone and an optimum vehicle speed when traveling uphill while traveling in the destination reachable vehicle speed zone set in FIG. 2 in the method for optimizing the traveling of the electric vehicle in accordance with the present disclosure.

FIGS. 4 and 5 illustrate the state when the vehicle travels downhill and uphill, respectively. The electric vehicle 1 can travel without the power of the high voltage battery 20 or with small power while the electric vehicle 1 is traveling downhill, such that the optimum vehicle speed $V_o$ increases and the destination reachable vehicle speed zone Z widens. On the other hand, when the vehicle travels uphill, the optimum vehicle speed $V_o$ reduces and the destination reachable vehicle speed zone Z is narrowed.

Figure 6:
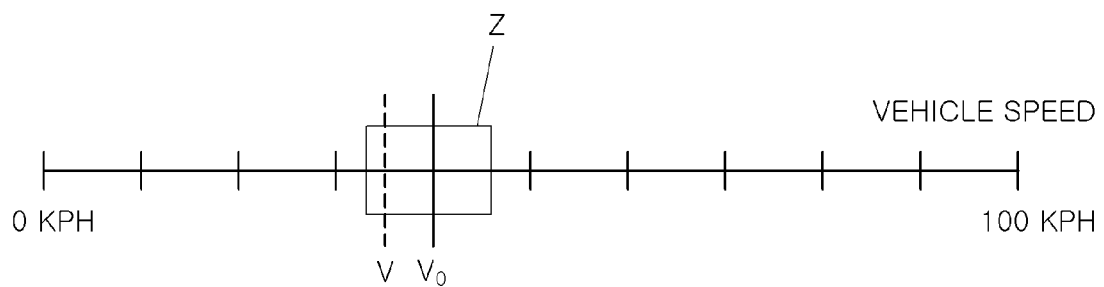
FIG. 6 is a schematic diagram illustrating an example of displaying a newly set destination reachable vehicle speed zone, an optimum vehicle speed, and a current vehicle when a SOC is smaller than that in FIG. 2 in the method for optimizing the traveling of the electric vehicle in accordance with the present disclosure.

FIG. 6 illustrates an example in which the destination reachable vehicle speed zone Z during traveling is narrowed as compared with FIG. 2. The destination reachable vehicle speed zone Z is narrowed, but the current vehicle speed V is still in the destination reachable vehicle speed zone Z, such that the vehicle can reach the destination even if the vehicle travels at the current vehicle speed. However, when the current vehicle speed V is further converged to the optimum vehicle speed $V_o$, the vehicle can reach the destination with less energy.

Figure 7:
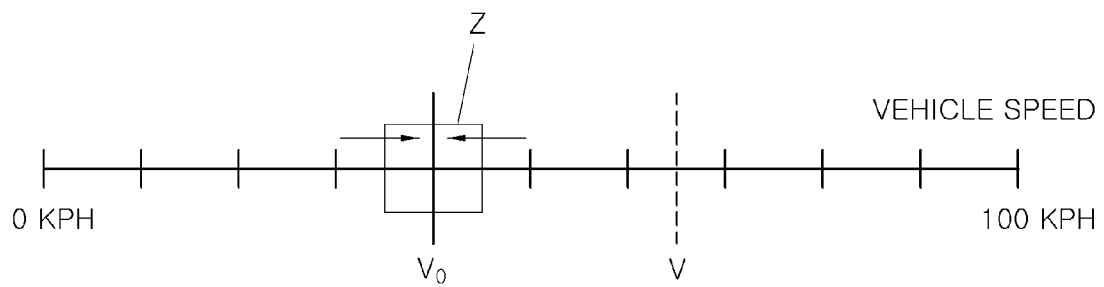
FIG. 7 is a schematic diagram illustrating an example of displaying a newly set destination reachable vehicle speed zone, an optimum vehicle speed, and a current vehicle speed when traveling out of the destination reachable vehicle speed zone set in FIG. 6 in the method for optimizing the traveling of the electric vehicle in accordance with the present disclosure.

FIG. 7 illustrates a newly set destination reachable vehicle speed zone Z, an optimum vehicle speed $V_o$, and a current vehicle speed V when traveling out of the destination reachable vehicle speed zone. That is, when the electric vehicle 1 continues to travel at the vehicle speed higher than the destination reachable vehicle speed zone Z, the destination reachable vehicle speed zone Z becomes narrowed continuously.

Changing a required torque S170 changes a required torque of the electric vehicle 1 at a speed adjacent to the optimum vehicle speed $V_o$ according to the operation amount of the accelerator pedal so that the electric vehicle 1 can maintain the optimum vehicle speed, and minimizes the energy consumed in the electric load of the electric vehicle 1.

Figure 8:
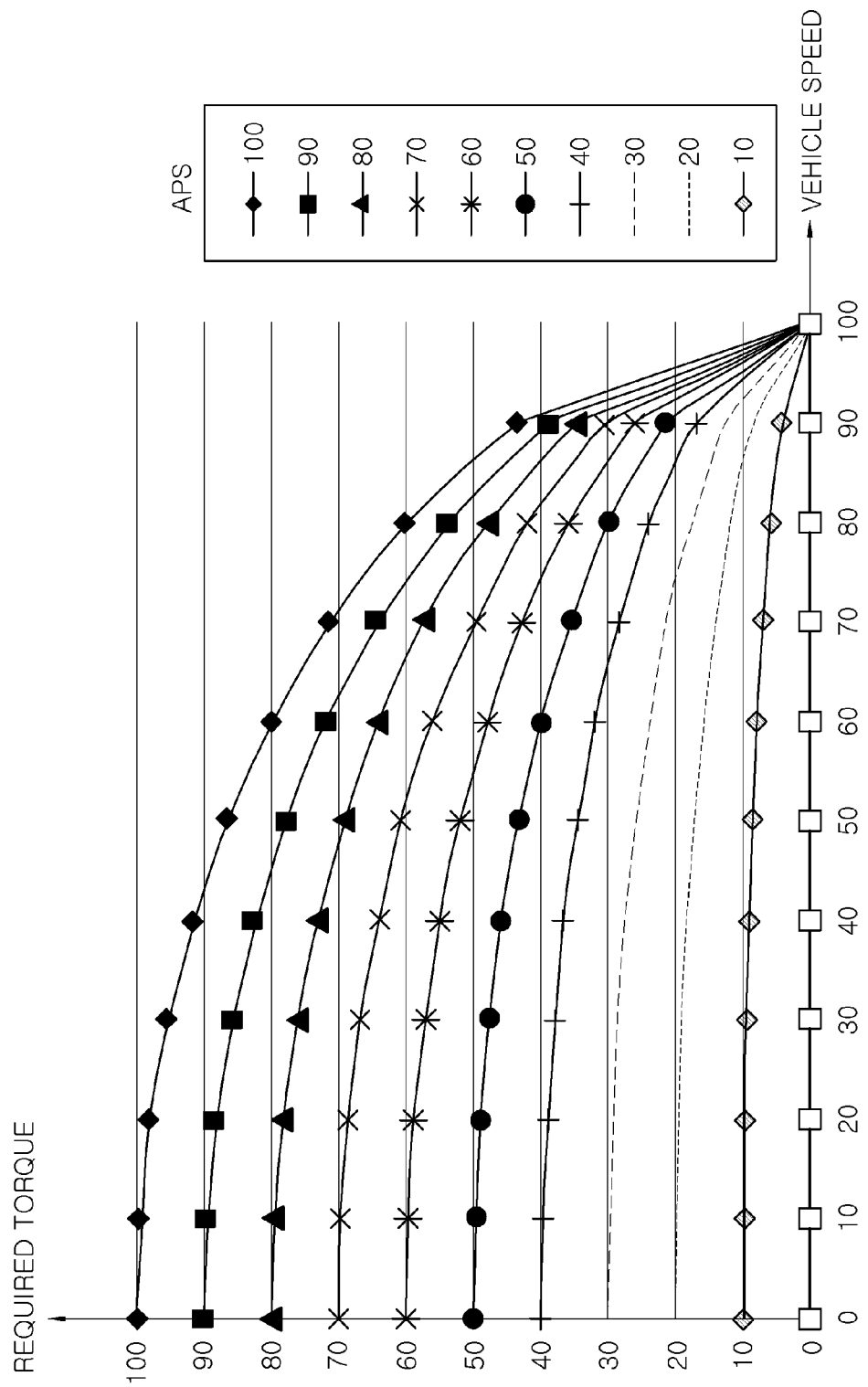
FIG. 8 is a graph illustrating a required torque according to a vehicle speed for each APS.
Figure 9:
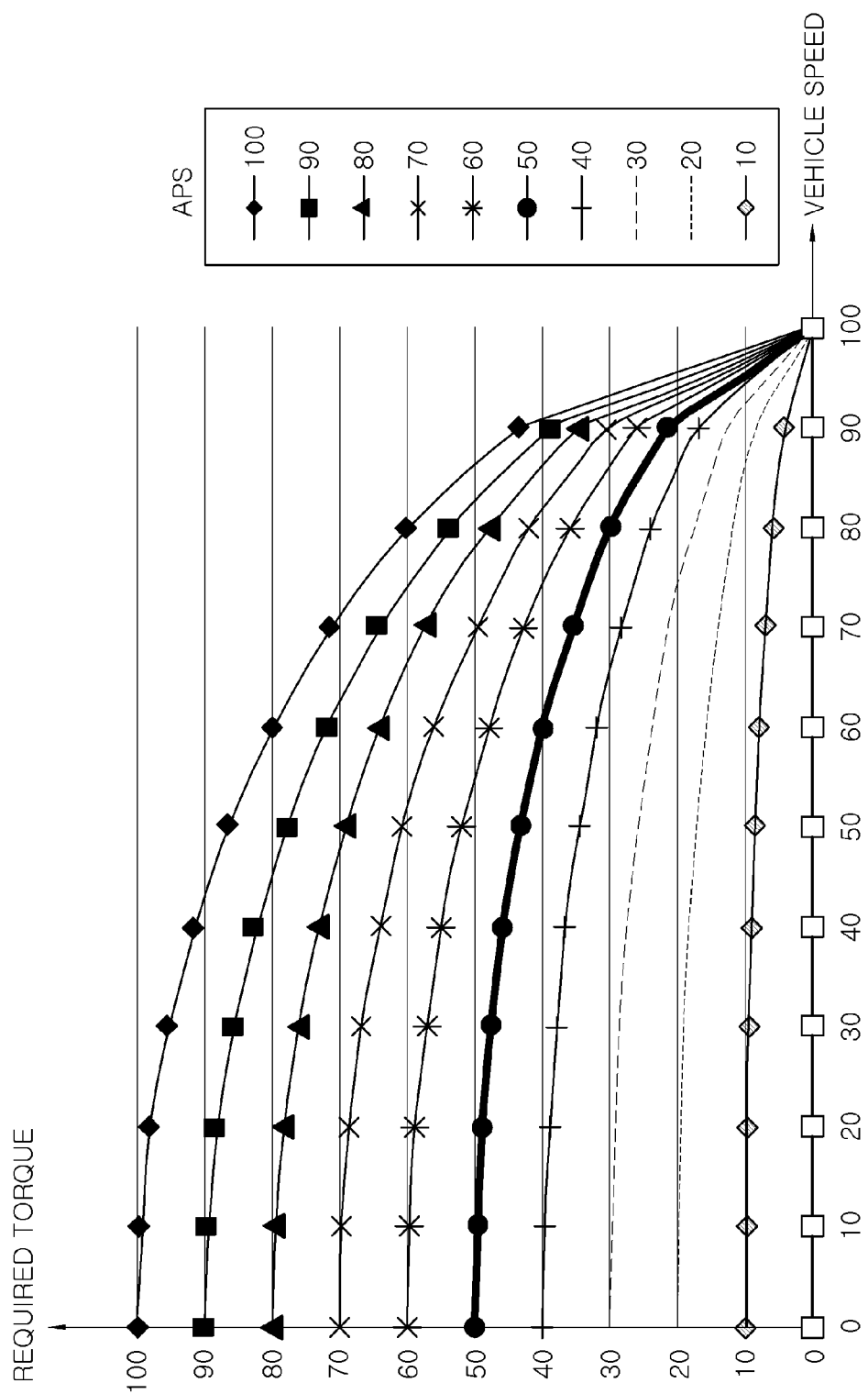
FIGS. 9 to 11 are graphs illustrating a change in the required torque according to the APS.

The operation amount of the accelerator pedal of the driver can be sensed from an Accelerator Location Sensor (APS), and basically, in the electric vehicle 1, the required torque according to the vehicle speed for each APS can be set as illustrated in a graph in FIG. 8.

First, the changing the required torque S170 calculates the required torque of the electric vehicle 1 for maintaining the optimum vehicle speed $V_o$, and selects the APS for maintaining the optimum vehicle speed $V_o$. The required torque for maintaining the optimum vehicle speed $V_o$ can be calculated by a sum of the constant-speed maintaining torque and the torque due to the gradient. The torque due to the gradient can be obtained by 'vehicle weight X gravitational acceleration X sin(f(x)) X tire dynamic radius.'

Figure 10:
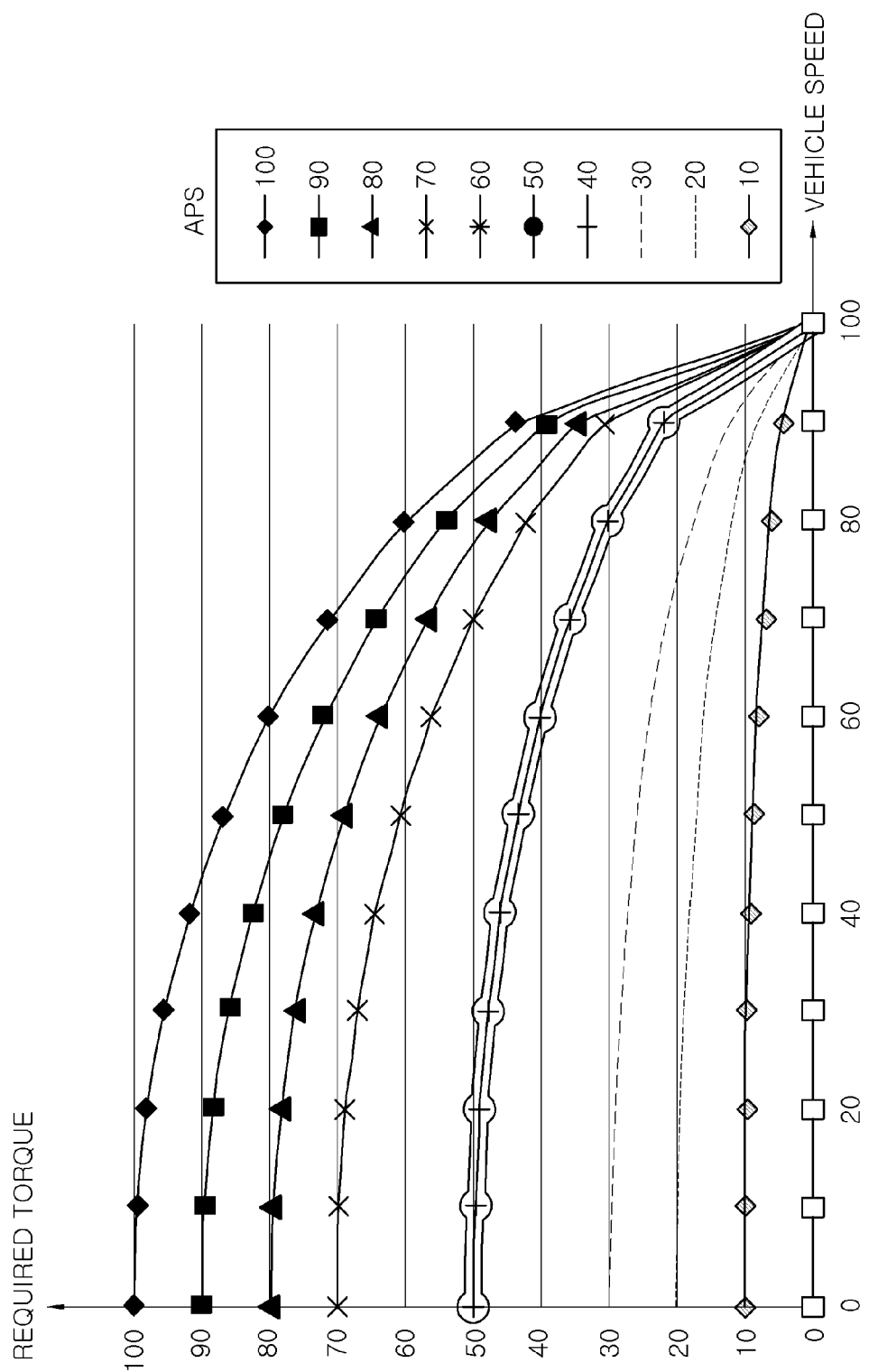

Then, a range of the APS is set to easily maintain the optimum vehicle speed so that the optimum torque is applied to the electric vehicle 1 when the APS 40 is operated for maintaining the optimum vehicle speed within the set range. For example, in FIG. 10, when a value of the APS 40 is 40% to 60%, it is set as the range of the APS that can maintain the optimum vehicle speed $V_o$. That is, when the APS has been previously set to 50% in order to maintain the optimum vehicle speed $V_o$, the required torque of the electric vehicle 1 is implemented by 50% APS when the accelerator pedal is operated by 40% APS or 60% APS adjacent thereto.

Figure 11:
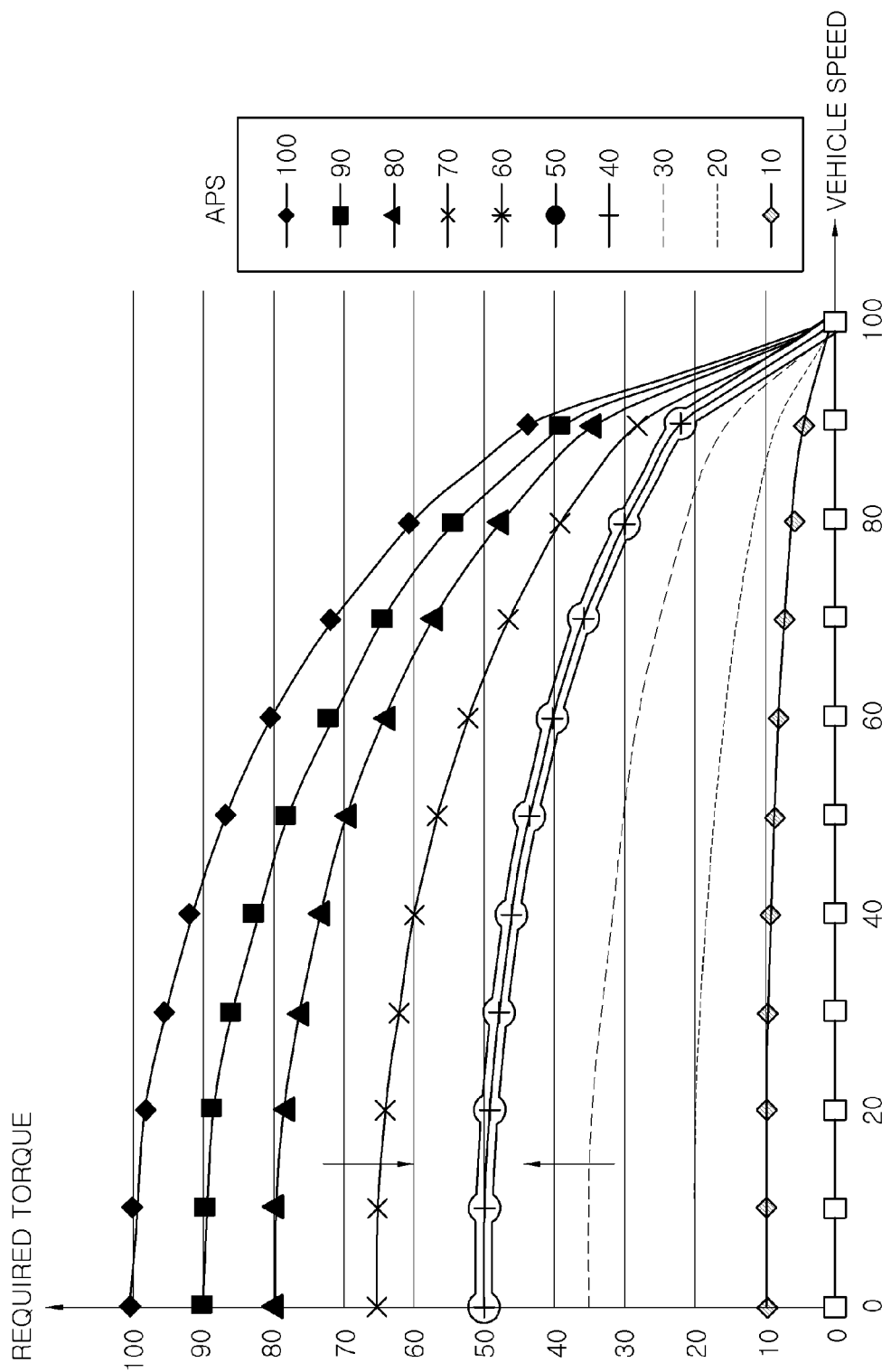

Meanwhile, when the range of the APS implementing the required torque capable of maintaining the optimum vehicle speed is set, the required torque is regulated in a range other than the above range so that it becomes adjacent to the required torque capable of maintaining the optimum vehicle speed $V_o$. That is, in FIG. 10, when the range of the APS is set to 40% to 60%, the required torque maps of the 40% APS and the 60% APS are not needed and removed, and in this time, the interval thereof is widened by deleting the required torque map. The 40% APS operates with the 50% APS and there is a large difference in the 30% APS and in the 40% APS, such that the required torque map of the 30% APS is upwardly changed. Likewise, the required torque map of 70% APS is downwardly changed as illustrated in FIG. 11.

As described above, when the electric vehicle 1 travels in the state where the required torque is changed, the SOC of the high voltage battery 20 reduces, and the distance to the destination reduces, such that it is repeatedly performed from the calculating the traveling energy S130. The electric vehicle 1 has already traveled a certain distance in the state where has already set the destination and has entered the ultra power saving mode, such that when the electric vehicle 1 is traveling, the calculating the traveling energy S130 for accumulating the traveling energy for each vehicle speed from the current location to the destination is performed again. That is, it is repeatedly performed from the calculating the traveling energy S130 according to the reduced distance to the destination and the reduced SOC of the high voltage battery.

The changing the required torque S170 downwardly changes a driving voltage of an LDC, and minimizes the energy consumed in the electric load of the electric vehicle 1.

When the ECU 10 determines that the electric vehicle 1 cannot reach the destination with the current SOC of the high voltage battery 20 in the determining whether or not to reach the destination S140, the ECU 10 performs guiding a charging station for guiding a nearby charging station by the navigation 51 S180.

When the electric vehicle 1 cannot reach the destination with the current SOC, the electric vehicle 1 is stopped on the road and is inevitably towed when continuously traveling to the destination. Accordingly, when the ECU 10 determines that the electric vehicle 1 cannot reach the destination with the current SOC of the high voltage battery 20 in the determining whether or not to reach the destination S140, it is guided to the charging station for charging the high voltage battery 20.

In this time, the charging station is a charging station located within the Distance To Empty with the current SOC of the high voltage battery 20.

What is claimed is:

1. A method for optimizing the traveling of an electric vehicle, comprising:
    setting an ultra power saving mode for controlling the traveling of an electric vehicle by minimizing consumed energy when a State Of Charge (SOC) of a high voltage battery is equal to or smaller than a predetermined SOC;
    calculating traveling energy required for traveling from a current location to a destination by a control unit of the electric vehicle;
    determining whether or not to reach the destination with the energy of the high voltage battery; and
    calculating a destination reachable vehicle speed zone that calculates a maximum speed and a minimum speed that can reach the destination,
    wherein the setting the ultra power saving mode sets an ultra power saving mode using energy charged in the high voltage battery and a remaining distance from the current location of the electric vehicle to the destination by the control unit of the electric vehicle, or
    wherein the setting the ultra power saving mode enters the ultra power saving mode by operating an ultra power saving mode setting means by a passenger of the electric vehicle, and
    wherein the control unit sets the ultra power saving mode by comparing a ratio of the remaining distance to the destination and a Distance To Empty that can travel with a current SOC with a predetermined ultra power saving mode entry reference value.

2. The method for optimizing the traveling of the electric vehicle of claim 1,
    wherein the ultra power saving mode reference value is set to be greater than 1.

3. The method for optimizing the traveling of the electric vehicle of claim 2,
    wherein the ultra power saving mode reference value is set according to the remaining distance to the destination.

4. The method for optimizing the traveling of the electric vehicle of claim 3,
    wherein the ultra power saving mode reference value is set to be inversely proportional to the remaining distance to the destination.

5. The method for optimizing the traveling of the electric vehicle of claim 1,
    wherein the calculating the traveling energy calculates the traveling energy required for traveling from the current location to the destination with a corresponding vehicle speed, respectively, according to a plurality of vehicle speeds.

6. The method for optimizing the traveling of the electric vehicle of claim 5,
    wherein the calculating the traveling energy, for each vehicle speed,
    calculates the traveling energy per unit distance,
    calculates additional energy per unit distance according to the road gradient,
    calculates the traveling energy per unit distance by adding the traveling energy per unit distance and the additional energy per unit distance,
    calculates the traveling energy that is the energy consumed to the destination at the corresponding vehicle speed by integrating the traveling energy per unit distance from the current location to the destination, and
    calculates the traveling energy for each vehicle speed.

7. The method for optimizing the traveling of the electric vehicle of claim 5,
    wherein the determining whether or not to reach the destination determines to be reachable to the destination when a value smaller than the energy charged in the high voltage battery is present among the traveling energy for each vehicle speed in the calculating the traveling energy.

8. The method for optimizing the traveling of the electric vehicle of claim 5,
    wherein the calculating the destination reachable vehicle speed zone sets between a maximum speed and a minimum speed that can reach the destination among the traveling energy calculated for each vehicle speed as a destination reachable vehicle speed zone.

9. The method for optimizing the traveling of the electric vehicle of claim 5,
    wherein the calculating the destination reachable vehicle speed zone sets a vehicle speed consuming minimum traveling energy among the traveling energy calculated for each vehicle speed as an optimum vehicle speed.

10. The method for optimizing the traveling of the electric vehicle of claim 9, further comprising displaying the destination reachable vehicle speed zone that displays the optimum vehicle speed and the destination reachable vehicle speed zone through a display, after the calculating the destination reachable vehicle speed zone.

11. The method for optimizing the traveling of the electric vehicle of claim 10,
    wherein the displaying the destination reachable vehicle speed zone displays the optimum vehicle speed, the destination reachable vehicle speed zone, and the current vehicle speed of the electric vehicle altogether.

12. The method for optimizing the traveling of the electric vehicle of claim 10,
    wherein in the displaying the destination reachable vehicle speed zone,
    the destination reachable vehicle speed zone is narrowly displayed as the SOC of the high voltage battery is low.

13. The method for optimizing the traveling of the electric vehicle of claim 10,
    wherein the displaying the destination reachable vehicle speed zone displays so that the destination reachable vehicle speed zone gradually becomes large when a speed, at which the SOC of the high voltage battery reduces, is slower as the electric vehicle travels, and
    displays so that the destination reachable vehicle speed zone gradually becomes small when a speed, at which the SOC of the high voltage battery reduces, is faster as the electric vehicle travels.

14. The method for optimizing the traveling of the electric vehicle of claim 9, further comprising changing a required torque of the electric vehicle according to the operation amount of an accelerator pedal of the electric vehicle, after the calculating the destination reachable vehicle speed zone.

15. The method for optimizing the traveling of the electric vehicle of claim 14,
wherein the changing the required torque sets a range of an accelerator position sensor (APS) for maintaining the optimum vehicle speed.

16. The method for optimizing the traveling of the electric vehicle of claim 15,
wherein the changing the required torque comprises
a first phase calculating the required torque of the electric vehicle for maintaining the optimum vehicle speed and selecting the APS for maintaining the optimum vehicle speed, and
a second phase setting the range of the APS that can maintain the optimum vehicle speed, and
wherein when the required torque is requested within the range of the APS set in the second phase, the required torque is generated by the APS selected in the first phase according to a required torque map of the electric vehicle.

17. The method for optimizing the traveling of the electric vehicle of claim 16,
wherein after the second phase,
the required torque map adjacent to the upper limit and the lower limit in the range of the APS set in the second phase is changed to be adjacent to the required torque map selected in the first phase.

18. The method for optimizing the traveling of the electric vehicle of claim 14,
wherein the changing the required torque downwardly changes a driving voltage of an LDC together with a change in the required torque, and minimizes the energy consumed in the electric load of the electric vehicle.

19. The method for optimizing the traveling of the electric vehicle of claim 14,
wherein when the electric vehicle is traveling after the changing the required torque,
it is performed from the calculating the traveling energy again.

20. The method for optimizing the traveling of the electric vehicle of claim 1, further comprising guiding the route to a charging station located within a Distance To Empty that can travel with the current SOC of the high voltage battery, when it is determined to be unreachable to the destination with the SOC of the high voltage battery in the determining whether or not to reach the destination.

* * * * *